April 30, 1940.  B. C. HASKIN  2,198,815
COMPOSITE PHOTOGRAPHY
Original Filed April 11, 1938   5 Sheets-Sheet 1

FIG.1.

INVENTOR.
BYRON C. HASKIN
BY
ATTORNEY.

April 30, 1940. B. C. HASKIN 2,198,815
COMPOSITE PHOTOGRAPHY
Original Filed April 11, 1938 5 Sheets-Sheet 3

INVENTOR.
BYRON C. HASKIN
BY
ATTORNEY.

April 30, 1940.　　　B. C. HASKIN　　　2,198,815
COMPOSITE PHOTOGRAPHY
Original Filed April 11, 1938　　5 Sheets-Sheet 5

INVENTOR.
BYRON C. HASKIN
BY W. L. Beatty
ATTORNEY.

Patented Apr. 30, 1940

2,198,815

UNITED STATES PATENT OFFICE 2,198,815

COMPOSITE PHOTOGRAPHY

Byron C. Haskin, Beverly Hills, Calif., assignor to Warner Bros. Pictures, Inc., New York, N. Y., a corporation of Delaware Original application April 11, 1938, Serial No. 201,372. Divided and this application October 14, 1938, Serial No. 234,978

2 Claims. (Cl. 88—16.6)

This invention relates to a method of projecting pictures and has for an object to project larger and/or more brilliant pictures on a picture screen.

Another object is to reduce the grain pattern of pictures projected from films having silver grain image emulsions.

A further object is to obtain accurate registration of a plurality of identical pictures projected on a picture screen from different angles.

The size and/or brilliancy of a picture projected on a screen by a projector employing the usual type of cellulose film as an image bearing medium is restricted due to heating effect of the light beam projected through the film. If the amount of light passed through the film is increased beyond a certain limit to either increase the size of the projected picture or to increase the brilliancy of the projected picture, the film will either burst into flame or be permanently damaged by the heat.

Furthermore, as the magnification of a picture projected from the usual type of film having a silver grain emulsion is increased, the grain pattern of the emulsion becomes more apparent and objectionable.

The present invention overcomes the above limitations and defects by simultaneously projecting in registered superposition a plurality of identical picture images. The resultant picture is not only more brilliant, permitting greater magnification, but the positive grain pattern is reduced. This reduction of grain pattern is different in different films or different portions of the same film. Therefore, the superposition of several identical and registered film images having different grain patterns will cause the projected images of the silver grains or grain clusters to overlap each other resulting in obliteration of these images.

The invention facilitates registration of the images by arranging the objective lenses of the projector to give equal magnification of the projected pictures, and moving each of the aperture gates for focusing purposes without disturbing the lenses.

The invention further provides for adjustment of a plurality of picture projectors arranged to project identical superposed and registered picture images on a screen while maintaining those images in registration by rotatably adjusting the projectors about axes intersecting the optical axes thereof.

The invention has particular utility in connection with the production of composite pictures wherein the above method is employed to project a background scene upon a translucent screen while photographing a foreground scene in front of the screen.

For further details of the invention reference may be had to the following specification taken in conjunction with the accompanying drawings wherein:

Fig. 9 is a side view, partly in section, of one of the mirror mounts.

Figure 1:
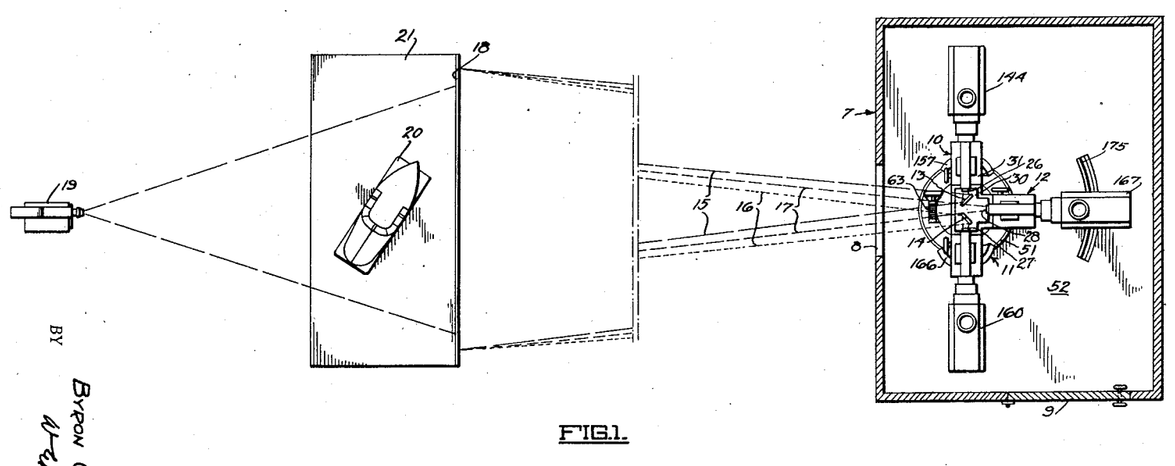
Fig. 1 is a plan view of a preferred form of apparatus, embodying the present invention, for producing composite motion pictures of the background projection type.
Figure 2:
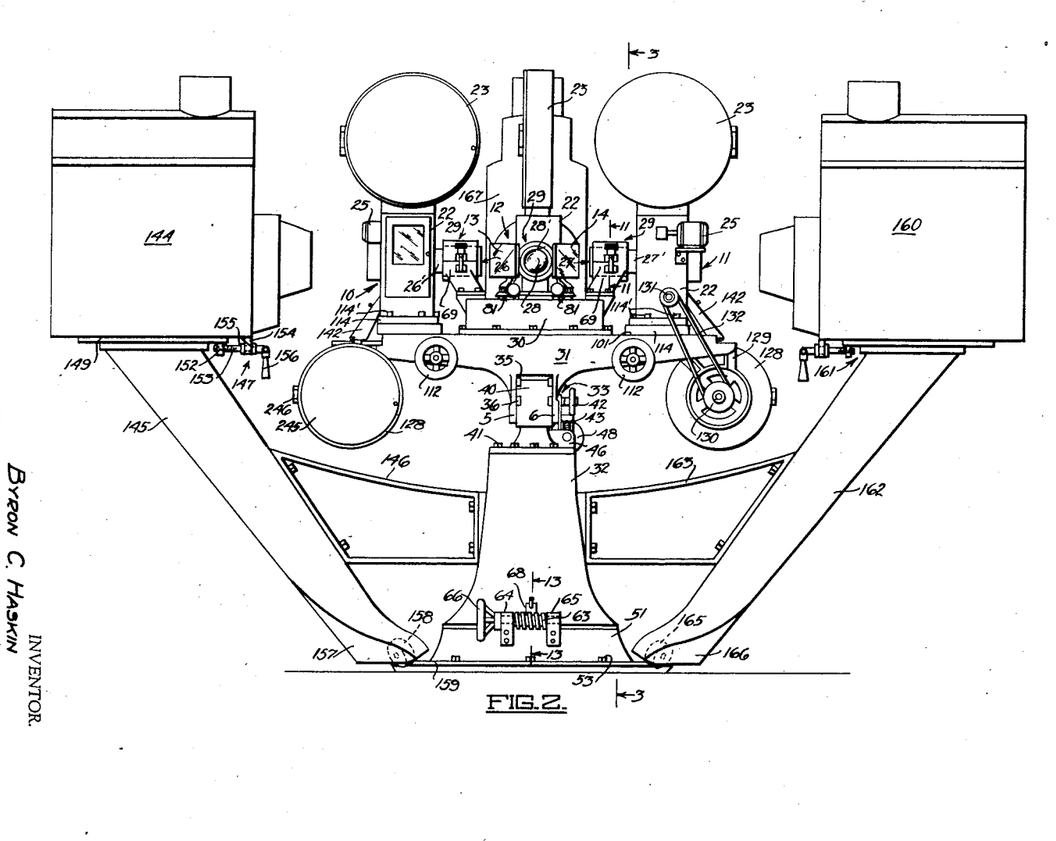
Fig. 2 is a front elevational view of the projector unit illustrated in Fig. 1.
Figure 3:
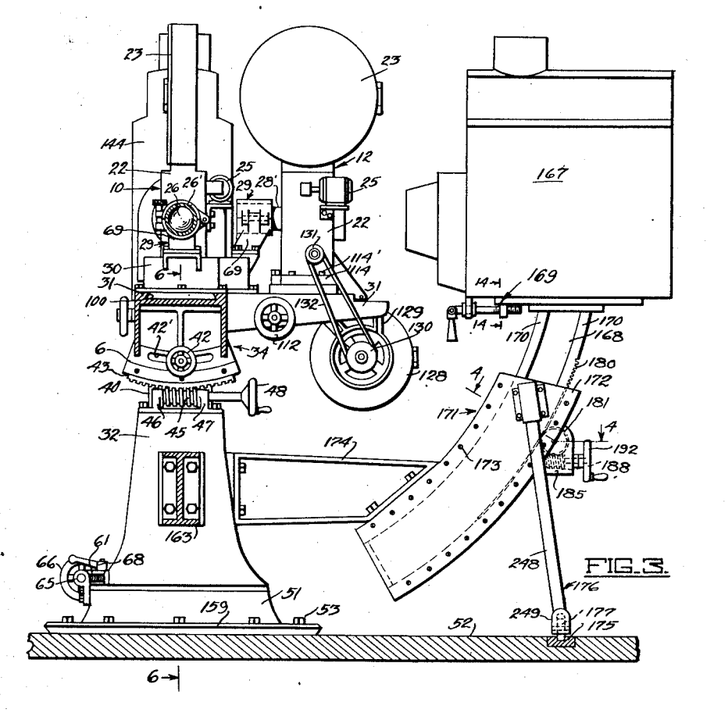
Fig. 3 is a sectional side elevational view taken substantially along the line 3—3 of Fig. 2.

Referring to Figs. 1, 2 and 3 in particular, the apparatus comprises generally a pair of opposed motion picture projectors 10 and 11 having their optical axes in alignment with each other. A third projector 12 is situated at right angles to both of the projectors 10 and 11 and has the optical axis thereof intersecting the optical axes of the opposed projectors. Mirrors 13 and 14 individual to the projectors 10 and 11, respectively, are provided to deflect the light beams therefrom in a direction substantially parallel to the light beam emitted by the projector 12. These mirrors 13 and 14 are preferably so adjusted that the light beams deflected thereby intersect each other and the light beam from the projector 12 at a screen surface so as to produce, when identical films are employed in the projectors 10, 11 and 12, a single picture with substantially three times the brilliancy of that obtainable from any one projector.

Fig. 1 shows an arrangement for producing composite motion pictures of the projected background type wherein the light beams 15, 16 and 17 from the projectors 10, 11 and 12, respectively, are superimposed in exact registration upon one surface of a translucent screen 18. The projector unit comprising the three projectors 10, 11 and 12 is shown as being housed in a fireproof booth 7 having an enlarged opening 8 in one wall thereof to permit passage of the light beams 15, 16 and 17. A door 9 in another wall of the booth 7 permits access to the interior thereof. The booth 7 may be movable if desired. A cinematographic camera 19 at the opposite side of the screen 18 is provided to photograph the images projected thereon. The foreground component 20 of the scene comprises as a matter of illustration a full size automobile situated on a stage 21 directly in front of the screen 18.

The camera 19 is coupled by suitable means, such as electrically interlocked synchronous motors, with the three projectors to insure synchronous movement of the film advancing mechanisms for the camera and the projectors. Electrical couplings of this type are well known in the art and it is therefore deemed unnecessary to describe the same in detail.

The projectors 10, 11 and 12 are identical with each other, each comprising generally a projector body 22, a film supply magazine 23 thereon, and a motor 25 for driving the various film actuating mechanisms therein. Objective lenses 26, 27 and 28 mounted in lens tubes 26', 27' and 28', respectively, for the projectors 10, 11 and 12, respectively, are supported independently of those projectors by three lens mounts 29 mounted on a casting 30. These lenses are optically matched with each other to permit equal magnification of the three projected images and to permit ready interchangeability without correcting various adjustments. Casting 30 is secured on top of a T-shaped projector bed or base 31, also forming a support for the various projectors. Projector bed 31 is supported upon a pedestal 32 for movement about a tilt axis passing through the centers of mirrors 13 and 14 which, incidentally, coincides with the aligned optical axes of the projectors 10 and 11 through a bearing assembly, generally indicated at 33. The bed 31 has a depending saddle 34 (Figs. 6 and 7) formed centrally thereof. Each leg 5 and 6 of the saddle 34 has a pair of segmental bearing strips 35 and 36 secured to the inner surface thereof by screws 37. These bearing strips are each concentric with the above described tilt axis and are received within arcuate bearing grooves 38 and 39 also concentric with the optical axes of projectors 10 and 11. These grooves 38 and 39 are formed in a head casting 40 secured by bolts 41 to the top of the pedestal 32. A lock screw 42 extends through an arcuate slot 42', concentric with the strips 35 and 36, in the leg 6 of the saddle formation 34 and is threaded in the head casting 40 to clamp the projector bed 31 in different tilted positions. A worm gear segment 43, concentric with the above described tilt axis is secured to the saddle leg 6 by bolts 44. Worm gear segment 43 meshes with a worm 45 rotatably carried in bearings 46 and 47 (Fig. 3) integrally formed on the head casting 40. A hand wheel 48 is provided to rotate the worm 45 to tilt the projector bed 31 and projectors thereon.

Pedestal 32 has an annular bearing surface 49 formed on the bottom thereof which is received on a corresponding bearing surface 50 formed on a main base 51 to permit rotation of the pedestal 32 and bed 31 about a vertical axis intersecting the intersection of the optical axes of projectors 10, 11 and 12. The base 51 is secured to the floor 52 of the projector booth 7 by bolts 53. A tubular column 54 extending axially of the pedestal 32 is secured at its lower end within a hollow boss 55 formed centrally in the base 51. Column 54 extends through bearings 56 and 57 supported within the pedestal 32 by radially extending flanges 58. The upper end of the column 54 is threaded to receive retainer nuts 59 to hold the pedestal 32 on the base 51 while permitting relative rotation therebetween.

Figure 13:
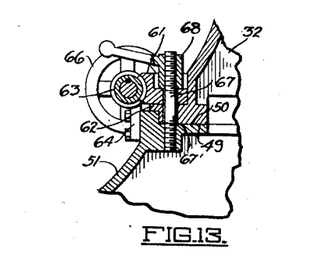
Fig. 13 is a fragmentary sectional view through the pan adjustment of the projector unit and is taken along the line 13—13 of Fig. 2.

Fig. 13 illustrates the adjustment for rotating the pedestal 32 on the base 51. This adjustment comprises a worm gear segment 61 suitably secured by bolts (not shown) on a flange 62 formed on the base of the pedestal 32. The worm gear segment 61 is concentric with the axis of rotation of the pedestal 32 and meshes with a worm 63 rotatably supported in spaced bearings 64 and 65 (Fig. 2) suitably secured to the base 51. A hand wheel 66 is provided to rotate the worm 63. A locking device is provided for locking pedestal 32 in any desired position and comprises a stud 67 suitably anchored in the base 51. Stud 67 extends upwardly through an arcuate slot 67' formed co-extensively through both the boss 62 and worm gear segment 61. Slot 67' is formed concentric with the axis of rotation of pedestal 32. The upper end of stud 67 is threaded to receive a clamp nut 68 for the purpose of locking the pedestal 32 on the base 51.

Figure 11:
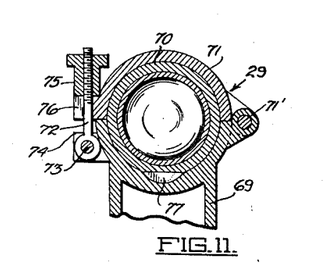
Fig. 11 is a transverse, sectional view through one of the objective lens mounts and is taken along the line 11—11 of Fig. 2.

Referring now to Fig. 11 the objective lens mount 29 for each of the objective lenses of the three projectors comprises a bracket 69 rigidly secured to the casting 30. The upper end of the bracket 69 is formed into a semi-circular lens receiving surface to receive the lower half of a sleeve 70 carrying lens tube 27' in which the various elements of the objective lens 27 are mounted. A semi-circular cover 71 is hinged at 71' to the bracket 69 and is adapted to clamp the sleeve 70 and its lens tube 27' in fixed position by means of a clamp screw 72. Screw 72 is pivotally secured at one end thereof to a pin 73 extending between a pair of spaced lugs 74 formed integrally with the bracket 69. A nut 75 threaded on the upper end of the screw 72 is adapted to bear against a pair of spaced lugs 76 on the cover 71 thus holding the cover in a clamped position. A key 77 carried by the bracket 69 and projecting into the semi-circular groove formed in the bracket 69 is provided to engage a corresponding notch in the sleeve 70 to facilitate correct positioning of the objective lens (Fig. 6).

Figures 6, 7:
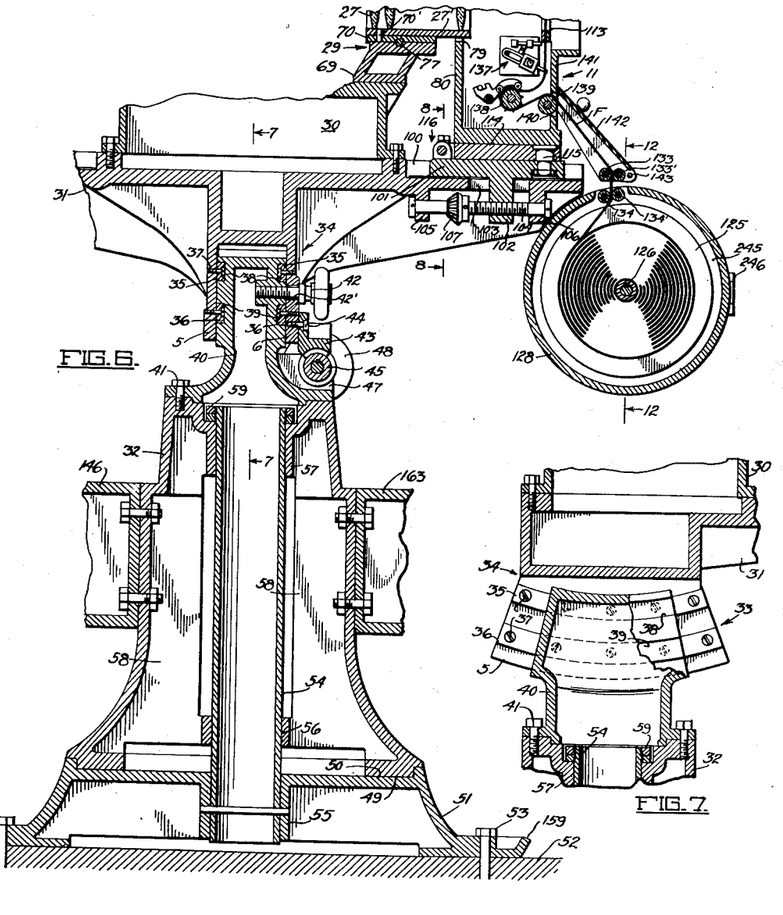
Fig. 6 is a sectional view, with parts broken away, through the support for the projector unit and is taken along the line 6—6 of Fig. 3.
Fig. 7 is a transverse sectional view through the bearings for supporting the projector unit for movement about a horizontal tilt axis and is taken along the line 7—7 of Fig. 6.

As shown in Fig. 6 the lens tube 27' is locked against longitudinal movement in the sleeve 70 by a dowel pin 70'. The other lens tubes are similarly locked in their respective sleeves 70.

In the original adjustment of the various objective lenses 26, 27 and 28, prior to the insertion of the dowel pins 70', each of the lens tubes 26', 27' and 28' is slid along its respective sleeve 70 until equal magnification is obtained for all lenses. The dowel pins 70' are thereafter passed through the lens tubes and their respective sleeves 70 to permanently retain the same in their correctly adjusted positions. Thereafter the magnification of all the lenses 26, 27 and 28 will be uniform, thus facilitating focusing adjustment.

As will be noted in Fig. 6 the objective lens tube 27' carrying the objective lens 27 of the projector 11 extends freely within an aperture 79 formed in the front wall 80 of the projector to permit projector 11 to be moved relatively to the fixed sleeve 70 for focusing purposes, without light leakage.

The above arrangement of the three projectors 10, 11 and 12 and their respective objective lenses 26, 27 and 28 provides a rigid support for all of the lenses without any metallic connection between the projector bodies 22 and their lenses and lens mounts except through the heavy base 31 and casting 30 which, due to their weight, are substantially free from any vibration. Furthermore, this arrangement permits focusing of the three projectors 10, 11 and 12 without disturbing their accurately aligned objective lenses.

Figure 10:
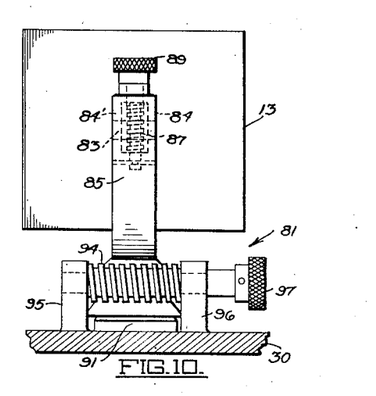
Fig. 10 is a rear view of the mirror mount illustrated in Fig. 9 and is taken in the direction of the arrow 10 of that figure.

The mirrors 13 and 14 are preferably of the front surface type such as obtained by employing highly polished "stellite" plates and are supported in adjustable mounts generally indicated at 81. The mount for mirror 13 is illustrated in Figs. 9 and 10. A triangular shaped lug 82 integrally formed on the rear of mirror 13 carries a transversely extending bearing pin 83 located substantially centrally of the mirror. A pair of flanges 84 and 84' formed on an adjustable member 85 saddles the lug 82 and forms bearings for the pin 83. A worm gear segment 86, concentric with the bearing pin 83 and formed on the lug 82, meshes with a worm 87 rotatably supported at either end thereof in bearings 88 and 89 formed in the member 85. A knurled knob 89 is provided to rotate the worm 87 to tilt the mirror about pin 83. Member 85 has a cone shaped hollow bearing surface 90 on the bottom thereof which fits over a frusto-conical bearing projection 91 provided on the upper surface of casting 30. Bearing 91 has the axis thereof passing centrally through the plane of the mirror surface of the mirror 13. A bolt 92 is provided to retain the member 85 on the bearing 91 while permitting rotation of member 85. Worm gear teeth 93 are formed around the base of the member 85 and are engaged by a worm 94 rotatably carried in bearings 95 and 96 projecting from the casting 30. A knurled knob 97 is provided to permit rotation of the member 85 about a vertical axis.

Each of the three arms of the T-shaped bed 31 has a dovetailed guideway 100 (Figs. 6 and 8) extending longitudinally thereon to slidably receive a slide 101. Slide 101 has a depending projection 102 integrally formed thereon which extends through an elongated slot 103 in the bed 31 and has threaded therethrough a screw 104. Screw 104 is journalled at either end thereof in bearings 105 and 106 depending from the base 31. A bevel gear 107 secured on the screw 104 meshes with a second bevel gear 108 carried on a shaft 109 journalled in bearings 110 and 111 depending from bed 31. A hand wheel 112 on the shaft 109 permits manual focusing adjustment of the projector.

Figure 8:
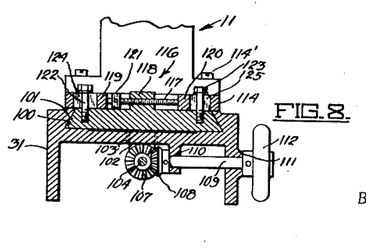
Fig. 8 is a transverse sectional view of the pan adjustment of each projector and is taken along the line 8—8 of Fig. 6.

Each projector is adjustable about a vertical axis passing through the center of the plane of the emulsion surface of the film in the film gate 113 (Fig. 6) thereof to compensate for any possible "keystone" effect of the projected images therefrom. A pad 114 secured to the bottom of each projector by screws 114' has a vertical pin 115 journalled therein and secured to the slide 101. Pin 115 is situated with the axis thereof passing centrally through the plane of the film F in the film gate 113 to permit movement of the projector therearound. The projector is movable about the pin 115 through an adjustment generally indicated at 116 (Fig. 8). This adjustment comprises a transversely extending screw 117 threaded within a projection 118 extending upwardly from the slide 101. Screw 117 abuts at either end thereof against a pair of spaced lugs 119 and 120 integrally formed on the projector pad 114. A turret 121 secured on the screw 117 is provided to permit manual rotation of the screw 117 for adjustment of the projector about the pin 115. Clamp screws 122 and 123 extend through elongated slots 124 and 125, respectively, in the pad 114 and are threaded in slide 101 to lock the pad 114 onto the slide 101. Slots 124 and 125 are formed concentric with pin 115.

Figure 12:
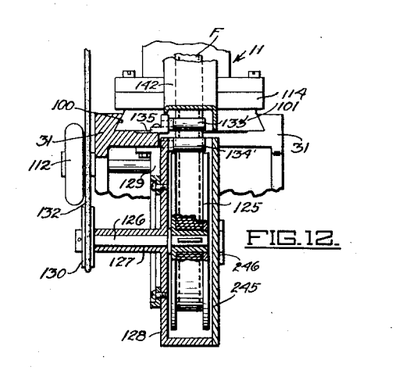
Fig. 12 is a transverse, sectional view through one of the take-up reel magazines and support therefor and is taken along the line 12—12 of Fig. 6.

Referring now to Figs. 6 and 12, the take-up reel 125 of each projector is supported by the bed 31 independently of its respective projector. The reel 125 is removably keyed on a spindle 126 journalled in a bearing 127 formed in a take-up magazine 128. Magazine 128 is supported from the under surface of a projection of the bed 31 by a bracket 129. Reel 125 is driven by a pulley 130 on shaft 126, deriving its rotation from a pulley 131 (Fig. 2) through a continuous flexible belt 132. The pulley 131 is suitably connected in the usual manner to the film driving mechanism in the projector.

The film F enters the take-up magazine 128 through a fire trap comprising two pairs of wringer or guide rollers 133, 133', 134 and 134'. The upper pair of rollers 133 and 133' are rotatably supported on pins carried on a bracket 135 (Fig. 12) mounted on the bed 31. The lower rollers 134 and 134' are rotatably mounted on pins extending from the wall of the magazine 128. The outer end of each pair of wringer rollers are free to permit the film to be passed transversely therebetween when threaded.

The film is drawn through the picture gate 113 of the projector by means of a pull down mechanism generally indicated at 137 (Fig. 6). Pull down mechanism 137 is preferably of the type employing pilot or register pins to permit accurate and steady registration of the film F while it is intermittently held stationary in the film gate 113. From the pull down mechanism 137 the film is passed around a hold back sprocket 138, over a guide roller 139, and thence between the two upper wringer rollers 133 and 133' of the take-up magazine fire trap. Roller 139 is rotatably mounted in the body of the projector and extends through an opening 140 in the rear wall 141 of the projector, thus guiding the film F from the projector to its take-up magazine in all focused positions thereof. A channel shaped cover member 142 is provided to protect the film passing between the roller 139 and the magazine 128. Cover 142 is pivoted on a pin 143 (Fig. 6)

projecting from a suitable bracket (not shown) on the base of the guideway 100 and is adapted to be swung outward to permit threading or inspection of the film. Due to the action of gravity cover 142 follows the rear wall 141 of the projector in all adjusted positions thereof. A door 245 hinged at 246 to the magazine 128 permits access to the take-up reel 125.

Figure 14:
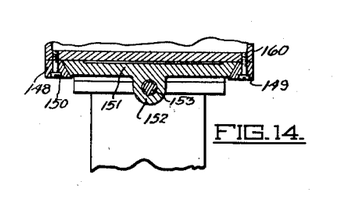
Fig. 14 is a transverse, sectional view through the lamp house focusing mechanism for one of the projectors and is taken along the line 14—14 of Fig. 3.

An arc light (not shown) is supported in a conventional type of lamp house 144 (Fig. 2) for illuminating the film in projector 10 to project an image thereof to the screen. Lamp house 144 is adjustably supported on a downwardly inclined arm 145 secured intermediate its length to a bracket 146 which, in turn, is secured to the side of the pedestal 32. Arm 145 is also supported by track 159 as described later. An adjustment generally indicated at 147 is provided to move the lamp house 144 longitudinally thereof to correctly position the same for different focusing positions of the projector 10. This adjustment 147 comprises bevelled guide strips 148 and 149 (Fig. 14) secured along either side of the lamp house by screws 150. A correspondingly bevelled guide member 151 fitting the guides 148 and 149 is suitably secured on top of the arm 145 and has a projection 152 depending therefrom to threadably receive an adjusting screw 153. Screw 153 is rotatably mounted in a projection 154 depending from the lamp house 144 and is prevented from longitudinal movement relative therewith by suitable collars 155 thereon situated on either side of the projection 154. A handle 156 on the end of screw 153 is provided to permit longitudinal manual adjustment of the lamp house 144.

Arm 145 has a hollow skirt 157 formed at the bottom thereof in which is rotatably mounted a pair of rollers, one of which is shown at 158. Rollers 158 ride along a track 159 integrally formed on the main base 51 to assist in supporting the lamp house 144. Track 159 extends concentric with the axis of rotation of pedestal 32.

The arc light for the projector 11 is provided in a lamp house 160, which is supported for longitudinal adjustment as generally indicated at 161, the same as the longitudinal adjustment for the lamp house 144. Lamp house 160 is supported on the top of an arm 162 secured intermediate its length to a bracket 163 which, in turn, is secured to the side of pedestal 32, opposite the point where bracket 146 is secured thereto. Arm 162 also has rollers, one of which is shown at 165, rotatably mounted in an enlarged skirt 166 therein for movement along the circular track 159.

It is to be noted that the lamp houses 144 and 160, although movable about a vertical axis through the center of pedestal 32 in fixed relation with their respective projectors, are not rotatable about a horizontal axis with those projectors when hand wheel 48 is manipulated to tilt the projectors.

Figure 4:
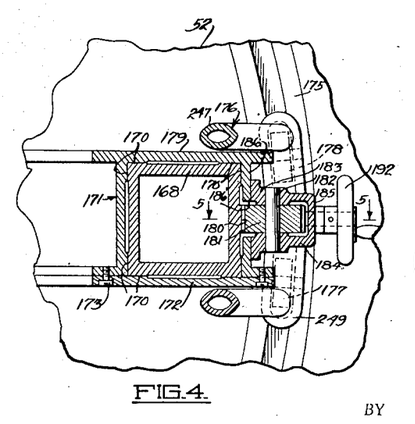
Fig. 4 is a sectional plan view through the support for the rear projector lamp house and is taken along the line 4—4 of Fig. 3.
Figure 5:
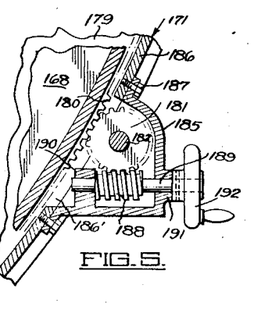
Fig. 5 is a fragmentary sectional view of the rear projector lamp house adjustment and is taken along the line 5—5 of Fig. 4.

A lamp house 167, similar to those of 144 and 160, carrying an arc light is provided for the projector 12. Lamp house 167 is supported on a curved arm 168, concentric with the aligned optical axes of the projectors 10 and 11, through longitudinal adjustment 169 similar to that provided for lamp houses 144 and 160. Arm 168 (Figs. 3, 4 and 5) is substantially square in cross section and has raised bearing portions 170 at either corner thereof. Arm 168 is slidable within a curved bearing member 171. Member 171 comprises in cross section a U-shaped casting 179 having a cover plate 172 secured thereto by screws 173 to enclose the arm 168. Bearing member 171 is supported in part by a bracket 174 secured thereto and to the pedestal 32 intermediate the points where brackets 146 and 163 are connected. Member 171 is also supported from a track 175 by a tubular framework 176 on the lower end of which is mounted a pair of rollers 177 and 178 movable along the track 175. Track 175 is concentric with track 159 and may be inset in the floor as shown in Figs. 1 and 3. Framework 176 comprises a pair of spaced vertically extending tubular posts 247 and 248 attached at their upper ends to either side of the bearing member 171 and terminating at their lower ends in a hollow skirt 249 in which are mounted the rollers 177 and 178.

Means are provided to move the lamp house 167 in a curved path to align the same with the projector 12 for different positions thereof about the horizontal tilt axis of the projector unit. To accomplish this a curved gear rack 180 is integrally formed along a portion of the arm 168. A gear 181 meshes with the rack 180 and is carried on an axle 182 journaled within bearings 183 and 184 formed in a gear casing 185. Gear casing 185 is secured to the outer flange 186 of the bearing member 171 by bolts 187 and encloses an aperture 186′ formed in the flange 186 to permit the gear 181 to mesh with rack 180. A worm 188 meshes with the gear 181 and has the shaft 189 thereof journalled within bearings 190 and 191 also formed in the gear casing 185. A hand wheel 192 is provided on the shaft 189 to permit manual rotation of the worm 188 to adjust the lamp house 167 about the horizontal tilt axis of the projector unit.

In operation, the various elements of the projector apparatus are adjusted as follows: The rear projector 12 is first illuminated to project the beam of light 17 therefrom onto the screen 18. The projector base 31 is then panned and tilted by means of the hand wheels 66 and 48, respectively, until the beam of light 17 is centrally located on the screen 18. This panning movement of base 31 has served to move all the lamps with their respective projectors as the projectors and their lamp houses are moved about a vertical axis when pedestal 32 is rotated by hand wheel 66. However, hand wheel 48 tilts all the projectors without tilting any of their respective lamp houses and lamp house 167 is the only one which must be given a corrected tilt adjustment (by hand wheel 192) when the projectors are tilted. With the construction shown, there is no necessity for a tilt adjustment of lamp houses 144 and 160 when all the projectors are tilted, as the tilt movement is about an axis passing through optical axis of lamp houses 144, 160 and their projectors. The hand wheel 192 is rotated until the lamp house 167 assumes the correct position relative to the projector 12, that is, until the arc light therein is aligned with the optical axis of the objective lens of projector 12. The arcs for the projectors 10 and 11 are then lit to project their beams 15 and 16, respectively, therefrom, onto the screen 18. The mirrors 13 and 14 are then adjusted roughly to register the two beams 15 and 16 with the beam 17 from projector 12.

If the background scene is to be projected in black and white, three identical positive prints from the same negative of the background scene are prepared and are threaded in the three projectors. However, if the background scene is to be projected in color according to the additive process, three positive prints are respectively prepared from three color separation negatives of different color aspects of the background scene (assuming a three color process is employed) and are threaded in the three projectors. Again, if the background is to be projected in color according to the subtractive process, three identical and natural colored prints of the same color negative or set of color negatives of the background scene are prepared and threaded in the three projectors. The three positive prints regardless of how they are obtained, are provided with synchronized starting marks by which they may all be started in the same relative positions in the projectors.

In any of the above cases, after the three projectors are properly threaded, they are successively illuminated and focused by the hand wheels 112 until the projected image from each is sharp on the screen 18. In the final adjustment all three projectors are illuminated and the mirrors 13 and 14 are minutely adjusted by means of the knob 89 and 97 (Figs. 9 and 10) to obtain exact registration of the three light beams 15, 16 and 17 on the screen 18.

In making a composite background type picture as illustrated in Fig. 1, the motor of the camera 19 is interlocked, as described hereinbefore, with the projector motors 25 to photograph the foreground 20 with the projected background picture appearing on the screen 18. This cinematographic operation may, of course, be performed while simultaneously recording the dialogue or other sounds produced by actors in or on the foreground set 20.

The above described apparatus is disclosed and claimed in my co-pending application Serial No. 201,372, filed April 11, 1938 for "Composite photography" of which the present application is a division.

When producing colored composite pictures using the additive type of projected colored background, three positive prints having different color aspects of the same background scene are placed in the three projectors. These prints may be either dyed in accordance with their respective color aspects or they may be ordinarily black and white prints, in which case, filters of colors corresponding to the color aspects of the prints are provided in front of the respective projectors so as to produce three differently colored image beams. These image beams when united in superposition on the screen render the projected background image in natural colors.

Colored composite pictures may also be produced by employing the subtractive type of projected colored background such as is obtained by using the well known "Technicolor" type of color films for projection. In this case three identical positive prints, each having been prepared in natural colors from the same set of negative films of the background are threaded in the three projectors. Each of these films is preferably obtained by successively imbibing dyes onto a substantially blank film from different negatives having different color aspects of the same scene. The negatives have previously been formed into matrices by mordanting and dyeing the images thereon with dyes of colors complementary to the color aspects of the negatives according to the "Technicolor" process. This subtractive type of projection has been found to be superior to the additive type of projection due to the reduced color filtering effect of the projected light beams as well as the reduction of grain and to the fact that the silver grain image, if any, in Technicolor prints is much fainter than the silver grain image in films used in the additive process, thus permitting more light to pass through the films.

Various color effects such as a correction of color balance or an increase in the intensity of a certain color component in projecting a colored background may be obtained by employing in the arc lights for the various projectors special carbon electrodes which emit a preponderance of one color or another.

The use of the invention in conjunction with the projection of ordinary black and white silver image films or dyed silver image films results in a large reduction of projected silver grain pattern. This pattern is due to the clustering of the minute silver grains in the film emulsions. Since the arrangement of the silver grain pattern in different films or different portions of the same film is, of course, different, the superposition of several identical and registered projected film images on a screen will result in the projected minute voids or openings caused by the clustering of grains in one film emulsion being filled by the projected images of the minute clustered grains themselves in another film emulsion.

Due to the above noted reduction of grain pattern the details and clearness of the projected picture will be materially increased. Also, due to the reduction of the minute voids in the projected pictures which are caused by the clustering of silver grains in the film emulsion, the shadows or darkened portions of the projected pictures will be rendered darker resulting in a greater contrast value between highlights and shadows. This increase in contrast value reduces the washed-out appearance noted in projected background type of composite pictures.

A further feature of the invention resides in the fact that the increase in luminosity or brilliancy of the projected background component of a composite scene permits the foreground component to be illuminated to a greater extent while preserving the lighting balance between the background and foreground components. Since the maximum exposure time of the camera is limited due to the fact that cinematographic cameras operated in conjunction with sound recording apparatus are maintained at a standard speed, i. e. twenty-four frames per second, the above feature permits smaller lens openings to be employed to increase the depth of focus of the cinematographic camera.

In the preferred form illustrated in Figs. 1 to 14, inclusive, the provision for tilting the projector unit about an axis passing through the centers of the angularly positioned mirrors has the advantage that the lengths of the optical paths between the films in the various projectors and the projection screen all remain the same for different tilted positions of the projector unit, and therefore the registration of the three projected images from the three projectors remains undisturbed. This feature remains the same regardless of the relative positions of the projectors. That is, if the projectors 10 and 11 were positioned midway between their illustrated positions and the projector 12 (or in any other position) while the mirrors 13 and 14 were adjusted to register the various superimposed projected images, this registration of the various images would remain undisturbed provided that the projector unit was tilted about the axis passing through the centers of the mirrors 13 and 14.

The importance of the above feature is recognized by the fact that a movement of the order of one inch of the projector unit toward or away from the projection screen will result in the registration of the superimposed projected images from the three projectors becoming noticeably disturbed.

In order to correctly adjust the position of the lamp house 167 for various tilted positions of the projector 12 on bed 31, corresponding scales may be provided on the leg 6 of saddle 34 and on the curved arm 168 supporting lamp house 167 to bring these members into alignment.

Although the invention has been described in reference to and is particularly adapted to the production of cinematographic composite pictures, it is to be understood that it may be employed in connection with the production of still composite pictures, or to the production of cinematographic composite pictures wherein still pictures are projected upon a background projection screen. It is further contemplated that the projection apparatus may be employed to project pictures on a screen for audience purposes. I intend, therefore, to be limited only to the extent indicated by the scope of the following claims.

I claim:

1. The method of increasing the light intensity of projected motion pictures and focusing the same while employing a plurality of motion picture projectors each having an objective lens and an aperture gate which comprises employing in said projectors prints having substantially identical kinematic aspects, simultaneously superimposing on a surface the pictures projected by said projectors, arranging the objective lenses of said projectors to give equal magnification of the projected pictures, and moving each of said aperture gates to vary the distance from each aperture gate to its respective objective lens for focusing purposes without disturbing said arrangement of said objective lenses.

2. The method of projecting cinematographic pictures which comprises arranging a motion picture projector on each side of a third motion picture projector and with the optical axis of all three of said projectors in a common plane, projecting a motion picture from said third projector to a screen at a remote point, simultaneously deflecting the beams from said outer projectors at points outside of the beam from said third projector, positioning said outer projectors with respect to their respective deflections so that the length of the optical path from each of said three projectors to said screen is substantially the same, adjusting the deflection of the beams from said outer projectors into registration with each other and with the beam from said third projector at said screen, and rotating said three projectors as a unit around an axis passing through the locus of the deflection of the beams from said outer projectors, to suitably position the projected picture on said screen.

BYRON C. HASKIN.